United States Patent
Kuno et al.

(10) Patent No.: US 6,917,445 B2
(45) Date of Patent: Jul. 12, 2005

(54) IMAGE DATA CONVERSION METHOD (75) Inventors: Masashi Kuno, Obu (JP); Masashi Ueda, Nagoya (JP); Masahiro Nishihara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 672 days.

(21) Appl. No.: 09/761,590

(22) Filed: Jan. 18, 2001

(65) Prior Publication Data

US 2001/0009463 A1 Jul. 26, 2001

(30) Foreign Application Priority Data

Jan. 19, 2000 (JP) ........................................ 2000-014037

(51) Int. Cl.⁷ ............................ G06F 15/00; G03F 3/08
(52) U.S. Cl. ......................... 358/1.9; 358/529; 358/523
(58) Field of Search ................................ 358/523, 518, 358/520, 501, 1.9, 529; 382/167; 347/14, 43, 101

(56) References Cited

U.S. PATENT DOCUMENTS

| | | | | |
|---|---|---|---|---|
| 5,331,440 A | * | 7/1994 | Kita et al. ................... | 358/529 |
| 5,386,305 A | * | 1/1995 | Usami ........................ | 358/518 |
| 5,402,245 A | * | 3/1995 | Motta et al. ................. | 358/1.9 |
| 5,528,386 A | * | 6/1996 | Rolleston et al. ............ | 358/522 |
| 5,719,956 A | * | 2/1998 | Ogatsu et al. ............... | 382/167 |
| 5,764,388 A | * | 6/1998 | Ueda et al. .................. | 358/529 |
| 5,764,795 A | * | 6/1998 | Takeo et al. ................. | 382/167 |
| 5,774,238 A | * | 6/1998 | Tsukada ...................... | 358/529 |
| 5,805,314 A | * | 9/1998 | Abe et al. .................... | 358/518 |
| 5,857,063 A | * | 1/1999 | Poe et al. ..................... | 358/1.9 |
| 5,861,963 A | * | 1/1999 | Tsuji .......................... | 358/530 |
| 5,894,358 A | * | 4/1999 | Ebner et al. ................. | 358/529 |
| 5,926,617 A | * | 7/1999 | Ohara et al. ................. | 358/1.9 |
| 6,039,434 A | * | 3/2000 | Moroney ...................... | 347/43 |
| 6,157,462 A | * | 12/2000 | Fan ............................. | 358/1.9 |
| 6,169,609 B1 | * | 1/2001 | Jacob et al. ................. | 358/1.9 |
| 6,222,639 B1 | * | 4/2001 | Suzuki ........................ | 358/1.9 |
| 6,466,332 B1 | * | 10/2002 | Fukasawa .................... | 358/1.9 |
| 6,483,606 B1 | * | 11/2002 | Klassen et al. .............. | 358/1.9 |
| 6,585,340 B1 | * | 7/2003 | Borrell ........................ | 347/14 |
| 6,752,494 B2 | * | 6/2004 | Matsui ........................ | 347/101 |
| 6,851,794 B2 | * | 2/2005 | Yamamoto ................... | 347/43 |
| 2002/0176105 A1 | * | 11/2002 | Kawai et al. ................ | 358/1.9 |

FOREIGN PATENT DOCUMENTS

JP          2002036598      *    2/2002    ............ B41J/2/175

* cited by examiner

*Primary Examiner*—Madeleine Nguyen
(74) *Attorney, Agent, or Firm*—Oliff & Berridge, PLC

(57) ABSTRACT

Input image data Ki for the black color component is divided into distribution data Tc, Tn, Ty, and Tk for the four color components C, M, Y, and K. The distribution data Tc, Tm, and Ty for the three color components C, M, and Y is combined to the input image data Ci, Mi, and Yi of the three color components C, M, and Y.

22 Claims, 6 Drawing Sheets

FIG.1

Related Art

[DISTRIBUTION TABLE]

| INPUT IMAGE DATA (Ki) | 0 | 1 | 2 | 3 | ... | 252 | 253 | 254 | 255 |
|---|---|---|---|---|---|---|---|---|---|
| DISPRIBUTION VALUE (Dc) | 0 | 1 | 3 | 5 | ... | 5 | 3 | 1 | 0 |
| DISPRIBUTION VALUE (Dm) | 0 | 1 | 2 | 3 | ... | 4 | 2 | 1 | 0 |
| DISPRIBUTION VALUE (Dy) | 0 | 2 | 4 | 7 | ... | 6 | 3 | 2 | 0 |
| DISPRIBUTION VALUE (Dk) | 0 | 0 | 0 | 0 | ... | 248 | 251 | 253 | 255 |

IMAGE DATA CONVERSION METHOD

BACKGROUND OP THE INVENTION

1. Field of the Invention

The present invention relates to an image data conversion method for converting input image data into output image data for recording operation.

2. Description of Related Art

Full color images can be ideally reproduced using three primary colors of cyan, magenta, and yellow. However, when a so-called gray scale is reproduced using a balance of inks in the three primary colors of cyan (C), magenta (M), and yellow (Y), it is very difficult to create a gray scale with a perfect balance in all tones. Sometimes, the resultant gray scale can appear with coloring, or with insufficiently dense black color.

To produce a single black dot image, pixels in the three primary colors of cyan, magenta, and yellow are ejected onto a recording medium at the same dot image position. If the pixels are ejected at positions slightly shifted from one another, then the region around the subject dot position will have coloring other than black. As a result, a sufficiently black color cannot be attained.

For the above-described purposes, presently-used many image recording devices, such as full-color printers, normally record full-color images using ink in four colors including black (K) in addition to the three primary colors of cyan, magenta, and yellow.

SUMMARY OF THE INVENTION

In this way, by using black color in addition to the three primary colors of cyan, magenta, and yellow, color images can be recorded with a proper black quality. However, the following problem still occurs.

When dots of black ink are ejected directly onto a light colored portion, the black dots will give the light colored portion a "rough" dot appearance, resulting in an unnatural-looking color image. For example, in order to record an image of a shadow falling on a color image of a person, three primary colors of cyan, magenta, and yellow are used to reproduce the image of the skin portion of the person and black ink is ejected onto the skin portion to reproduce the image of the shadow portion. In this case, dots of black ink make the light colored skin portion appear rough and unnatural.

When image data is configured from three primary colors of red (R), green (G), and blue (B), images can be recorded using four colors of cyan, magenta, yellow, and black by converting the RGB image data into CMYK image data configured from four colors of cyan, magenta, yellow, and black. In this case, the "roughness" problem described above can be handled in the following conceivable manner.

Figure 1:
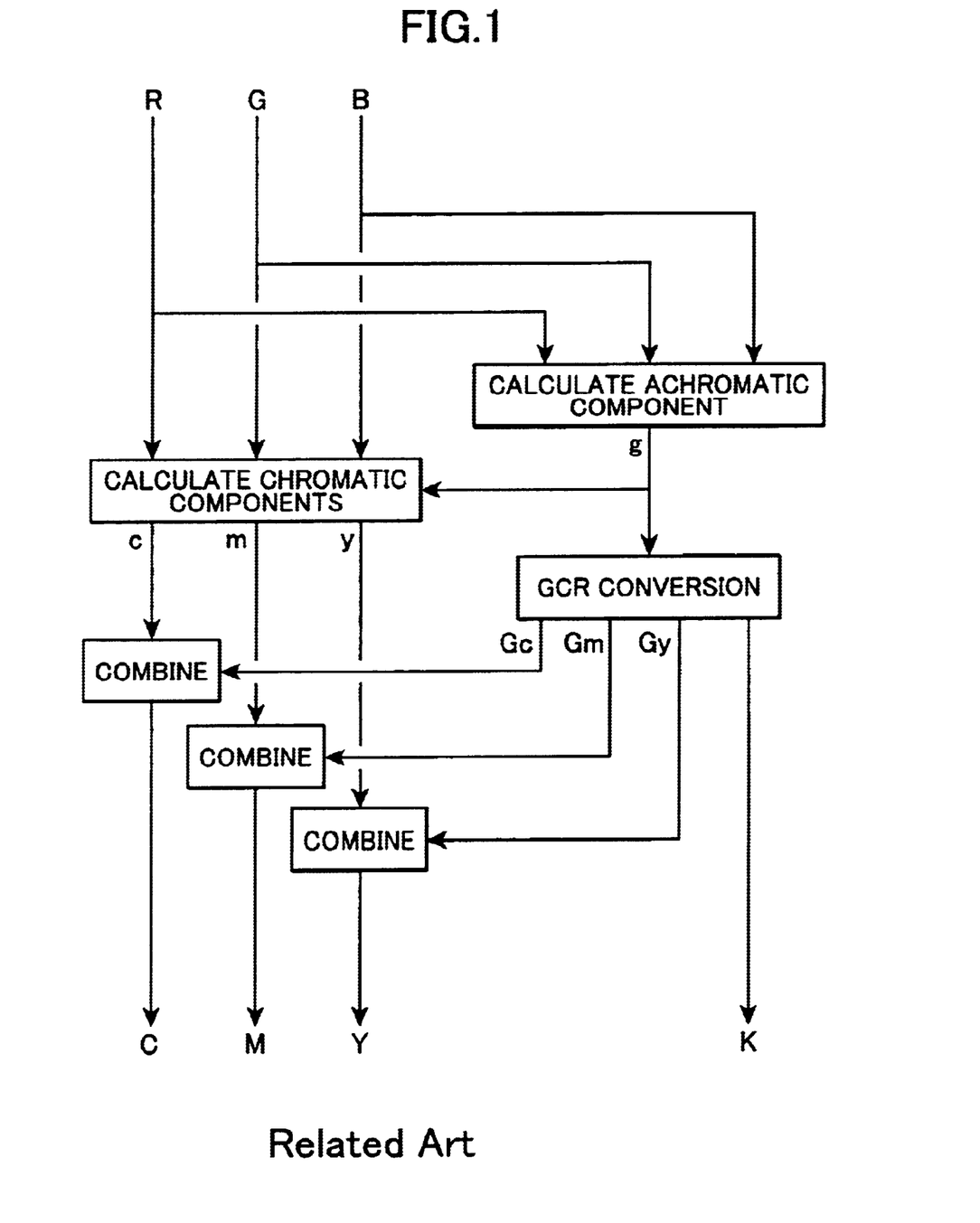
FIG. 1 is a schematic view representing a conceivable image data conversion process executed for recording a full color image based on input image data that is configured from three primary colors of red, green, and blue.

First, as shown in FIG. 1, an achromatic or gray component (g) is calculated based on the input image data (R, G, B) which is formed from the three primary colors of red, green, and blue. Then, chromatic components (c, m, y) are calculated based on both of the achromatic component (g) and the input image data (R, G, B). In order to distribute the calculated achromatic component (g) into the chromatic components (c, m, y), a so-called GCR (Gray Component Replacement) conversion or the like is performed onto the calculated achromatic component (g) so as to calculate distribution data (Gc, Gm, Gy) and an achromatic component (K). The achromatic component (K) will be actually outputted as a black color component of the CMYK image data. By combining the distribution data (Go, Gm, Gy) to the color components (c, m, y), cyan, magenta, and yellow components of the CMYK image data are obtained. Thus, the input image data (R, G, B), configured from the three primary color components of red, green, and blue, is properly converted into output image data (C, M, Y, K), which is configured from the four colors of cyan, magenta, yellow, and black. When color images are recorded based on the output image data (C, M, Y, K), generation of black ink dots on light colored portions can be suppressed, so that undesired black ink "roughness" can be prevented from occurring.

It is noted, however, that input image data is not always configured from three primary colors of red, green, and blue, but can be configured from four color components of cyan, magenta, yellow, and black. However, the above-described conceivable method cannot convert input image data (C, M, Y, K), that is configured from the four color components of cyan, magenta, yellow, and black, into output image data (C, M, Y, K) for recording operation.

It is noted that when RGB input image data (R, G, B) represents a color image, the gray component of the color image can be represented by the achromatic component (g) only. However, when CMYK input image data (C, M, Y, K) represents a color image, the gray component of the color image can be represented not only by the K component but also by CMY components because CMY and RGB are complementary colors. It is therefore difficult to properly separate a gray component from the CMYK input image data.

It is therefore an objective of the present invention to provide an image data conversion method for converting input image data, configured from the four color components of cyan, magenta, yellow, and black, into output image data appropriate for an image recording device to record in full color so that black ink "roughness" does not appear noticeable in light colored portions.

In order to solve the above and other objects, the present invention provides an image data conversion method for converting input image data for four color components of cyan, magenta, yellow, and black into output image data for recording operation, the method comprising the steps of: receiving input image data for four color components of cyan, magenta, yellow, and black; dividing the input image data for the black component into distribution data for the four color components of cyan, magenta, yellow, and black, thereby converting the input image data for the black component into output image data for the black component; and combining the distribution data for cyan, magenta, and yellow color components and the input image data for the cyan, magenta, and yellow color components, respectively, thereby converting the input image data for the three color components of cyan, magenta, and yellow into output image data for the three color components of cyan, magenta, and yellow.

The distribution data for the black color component may preferably have a characteristic that the distribution data has a tone value of zero when the tone value of the input image data for the black component is lower than a predetermined reference tone value, that the tone value of the distribution data becomes greater than zero when the tone value of the input image data for the black component is equal to or greater than the predetermined reference tone value, and that the tone value of the distribution data increases as the tone value of the input image data for the black component increases from the predetermined reference tone value.

Thus, in the middle and dark tone regions where the tone value of the input image data for black color component is greater than the reference tone value, the amount of the black color component, to be reproduced by black ink, will increase as the tone value of the input image data for black color component increases. Accordingly, it is possible to prevent the gray scale from being colored in the dark tone region. It is possible to prevent the gray scale from having insufficient black density.

The distribution data for the three color components of cyan, magenta, and yellow may have tone values to reproduce, with cyan, magenta, and yellow color components, a gray scale whose tone level corresponds to a difference between the tone value of the distribution data for the black component and the tone value of the input image data for the black component.

Accordingly, even when the black color component is added to the middle of the gray scale reproduced by cyan, magenta, and yellow, the gray scale will have a smooth gradual tone representation with no point of inflection in its tone level.

The reference tone value may be set to a tone value that can produce, according to the distribution data for the three color components of cyan, magenta, and yellow, a color patch that has an optical density whose value has a predetermined relationship with another optical density represented by another color patch that is produced according to image data of the maximum tone value for the black color component. For example, the reference tone value may be set to a tone value that can produce, according to the distribution data for the three color components of cyan, magenta, and yellow, a color patch that has an optical density whose value is equal to a half of another optical density represented by another color patch that is produced according to image data of the maximum tone value for the black color component.

Accordingly, output of dots of black ink will be started after the optical density obtained by ink of the three colors of cyan, magenta, and yellow has a sufficiently high value. Accordingly, black ink dots will appear unnoticeable to human visual sense, but will provide a desirable natural-looking full color image.

The manner of combining the distribution data to the input image data may be switched according to the tone values of the input image data for the three color components of cyan, magenta, and yellow. Accordingly, processings suitable for the respective regions of: the brightness tone region, the intermediate tone region, and the dark tone region, can be switchingly performed automatically. Tone reproducibility can be enhanced.

The dividing step may include the step of combining the distribution data for black color component with the input image data for the black color component, thereby converting the input image data for the black color component into the output image data for the black color component.

When a brightness index, determined based on the tone values of the input image data for the three color components of cyan, magenta, and yellow, is located in a predetermined dark tone region, the input image data for the four color components of cyan, magenta, yellow, and black may be converted, as it is, into the output image data. When the brightness index is located in a predetermined intermediate tone region, the distribution data for the four color components may be adjusted before being combined with the input image data for the corresponding colors. For example, when the brightness index is located in the predetermined intermediate tone region, the distribution data for the four color components may be multiplied with a coefficient, of a value greater than zero (0) and smaller than one (1), before being combined with the input image data for the corresponding colors.

In the dark tone region, four color components of cyan, magenta, yellow, and black are reproduced by four color inks of cyan, magenta, yellow, and black, respectively. It is therefore possible to prevent degradation of tone characteristic. It is possible to effectively prevent occurrence of insufficiency in black density that will possibly occur when black color component is distributed to the three color components of cyan, magenta, and yellow in the dark tone region.

The input image data for the three color components of cyan, magenta, and yellow may be subjected to a compression process before being combined with the distribution data for the three color components of cyan, magenta, and yellow, thereby preventing the output image data from exceeding a predetermined maximum tone value.

Accordingly, the output image data, obtained for the three color components of cyan, magenta, and yellow, will not overflow even when it is obtained by the combination of distribution data with the input image data for the corresponding colors. It is possible to effectively prevent tone from flattening in the dark tone region, but will ensure generation of a suitable gradation in the tone.

According to another aspect, the present invention provides an image data conversion apparatus for converting input image data for four color components of cyan, magenta, yellow, and black into output image date for recording operation, the apparatus comprising: a receiving unit receiving input image data for four color components of cyan, magenta, yellow, and black; a dividing unit dividing the input image data for black component into distribution data for the four color components of cyan, magenta, yellow, and black, thereby converting the input image data for the black component into output image data for the black component; and a combining unit combining the distribution data for cyan, magenta, and yellow color components and the input image data for the cyan, magenta, and yellow color components, respectively, thereby converting the input image data for the three color components of cyan, magenta, and yellow into output image data for the three color components of cyan, magenta, and yellow.

According to still another aspect, the present invention provides a data storage medium storing, in a manner readable by a computer, data of an image data conversion program for converting input image data for four color components of cyan, magenta, yellow, and black into output image data for recording operation, the program comprising: a program of receiving input image data for four color components of cyan, magenta, yellow, and black; a program of dividing the input image data for black component into distribution data for the four color components of cyan, magenta, yellow, and black, thereby converting the input image data for the black component into output image data for the black component; and a program of combining the distribution data for cyan, magenta, and yellow color components and the input image data for the cyan, magenta, and yellow color components, respectively, thereby converting the input image data for the three color components of cyan, magenta, and yellow into output image data for the three color components of cyan, magenta, and yellow.

BRIEF DESCRIPTION OF THE DRAWINGS

The above and other objects, features and advantages of the invention will become more apparent from reading the following description of the embodiment taken in connection with the accompanying drawings in which.

DETAILED DESCRIPTION OF THE EMBODIMENT

Next, an image recording system according to an embodiment of the present invention will be described while referring to the attached drawings.

Figure 2:
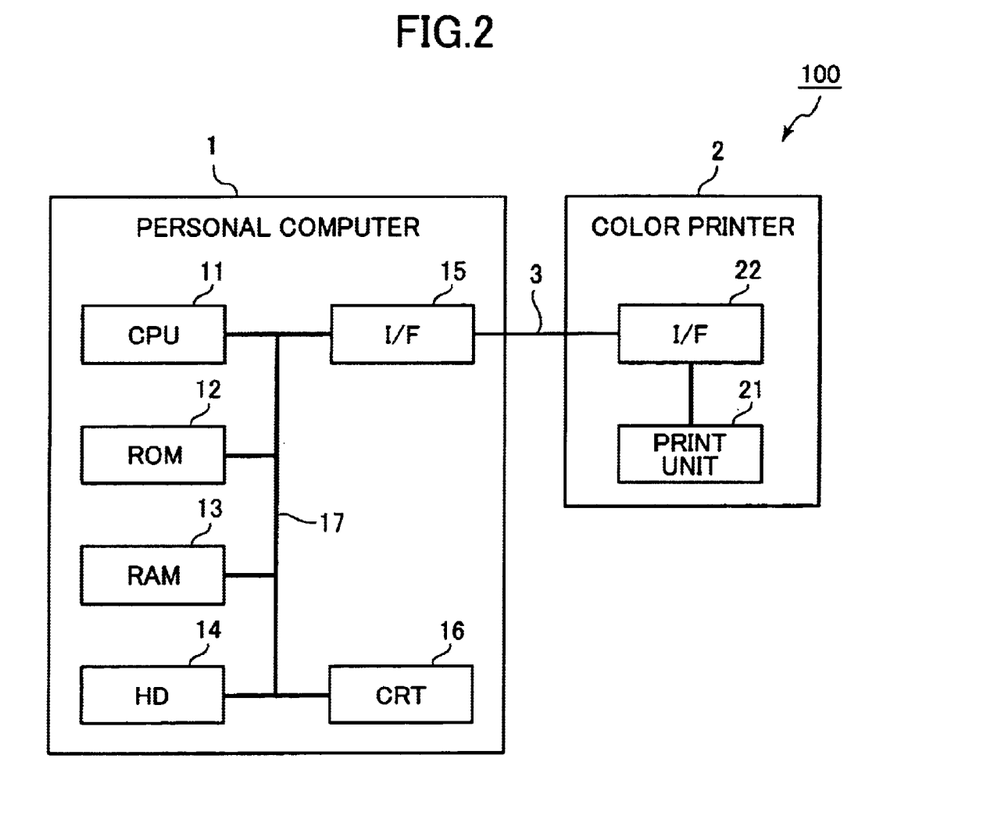
FIG. 2 is a block diagram showing electrical components of an image recording system for executing an image data conversion process, according to an embodiment of the present invention, to convert input image data that is configured from four colors of cyan, magenta, yellow, and black.

As shown in FIG. 2, an image recording system 100 of the present embodiment includes a personal computer 1 and a color printer 2. The personal computer 1 and the color printer 2 are connected by a dedicated interface cable 3 for data transmission.

The personal computer 1 includes a central processing unit (CPU) 11, a read-only memory (ROM) 12, a random access memory (RAM) 13, a hard disk 14, a printer interface (I/P) 15, and a cathode-ray tube (CRT) display 16, all connected together by a bus 17 for data transmission.

The CPU 11 is for executing various control operations and calculation operations according to various programs stored in the ROM 12 and according to other various programs retrieved from the hard disk 14 and stored in the RAM 13. The ROM 12 stores the various control programs, and also various types of data.

The RAM 13 is capable of storing the various programs retrieved from the hard disk 14, and also various data obtained from calculations performed by the CPU 11.

The had disk 14 serves as an auxiliary storage unit storing, as files, data and programs which are not stored in main memories such as the ROM 12 or the RAM 13. The hard disk 14 stores data of an image data conversion process program, for executing an image data conversion process (FIG. 3) to convert input image data (Ci, Mi, Yi, Ki) into output image data (Co, Mo, Yo, Ko) for recording operation. Thus, the hard disk 14 serves as a data storage medium storing data of a program of the image data conversion process.

The hard disk 14 also stores a distribution table T (FIG. 5) which is used during the image data conversion processes. The hard disk 14 further stores a variety of profiles, such as a color correction table, a tone correction table, and a conversion table.

The printer interface 15 is for performing two-way data transmission between the computer 1 and the color printer 2 according to a specific transmission protocol agreed upon by the computer 1 and the color printer 2. The CRT 16 is for displaying various types of data in a form visually recognizable by the user of the system 100.

The color printer 2 includes an ink-jet type print unit 21 and a PC interface 22. The print unit 21 is capable of performing data transmission with the personal computer 1 through the PC interface 22 and the printer interface 15.

The print unit 21 is of a type that forms images on a recording medium by ejecting ink of four colors of cyan (C), magenta (M), yellow (Y), and black (K) based on output image data (C, Mo, Yo, Ko) received from the personal computer 1. The print unit 21 is configured to record full color images, having density levels of 256 tones for each of cyan, magenta, yellow, and black colors, by selectively ejecting dots of the four color inks according to the received output image data (Co, Mo, Yo, Ko). It is noted that when the print unit 21 receives a tone value Ao (=Co, Mo, Yo, or Ko), the print unit 21 ejects ink of a corresponding color at an ejection rate "La" (where a=c, m, y, or k; $0 \leq La \leq 1$), wherein La=Ao/255. For example, when the print unit 21 receives a tone value Co of 100, the print unit 21 ejects ink of cyan color at an ejection rate "Lc" of 100/255.

Next, the distribution table (look up table) T will be described in detail with reference to FIGS. 5–8. The distribution table T is produced in advance and stored in the hard disk 14.

Figure 5:
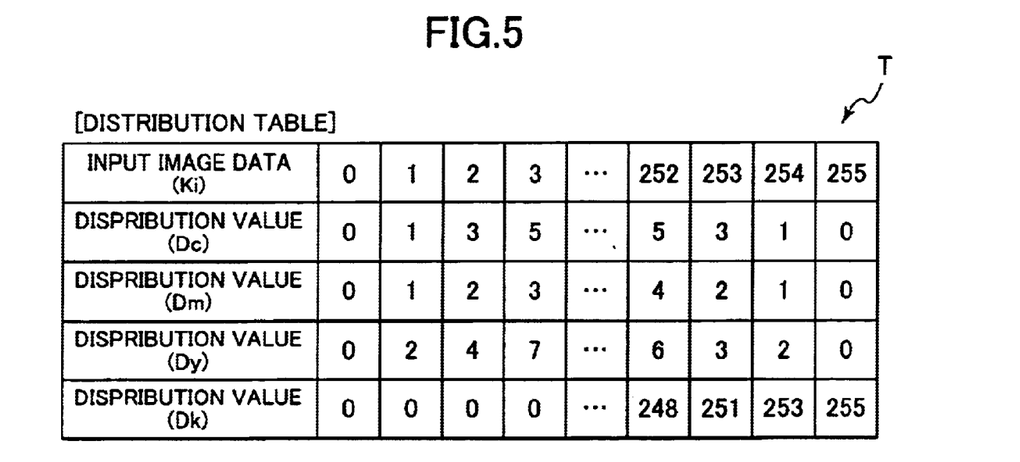
FIG. 5 is a schematic view of a distribution table which is used during the image data conversion process.
Figure 6:
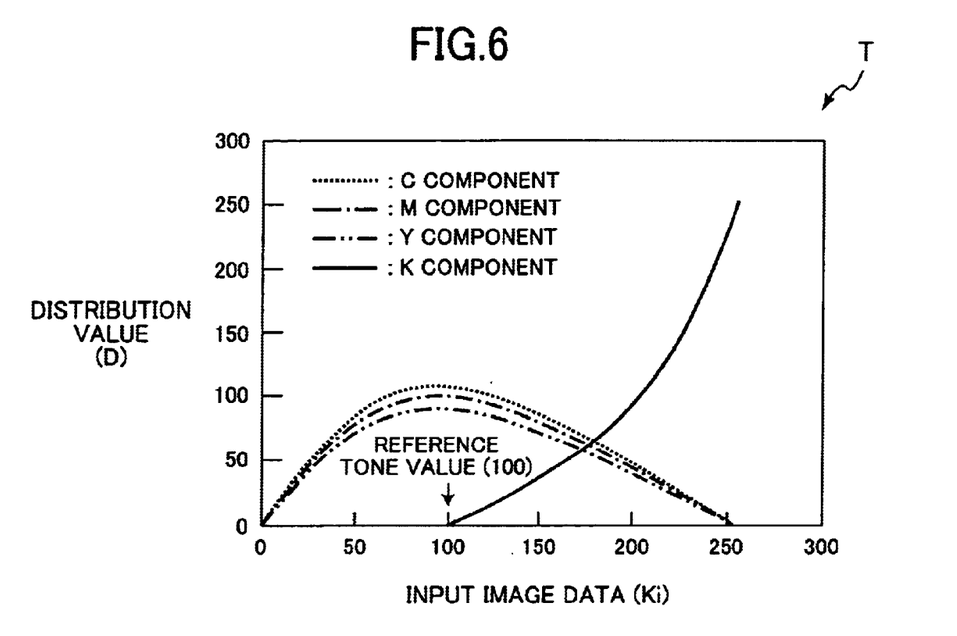
FIG. 6 is a graph representing how the black component of input image data is distributed into plural color components according to the distribution table of FIG. 5.

As shown in FIGS. 5 and 6, in the distribution table T, distribution values Dc, Dm, Dy, Dk, for cyan, magenta, yellow, and black components, are stored in correspondence with all of the tone values of 0–255 which will be possibly inputted as black component Ki of input image data (Ci, Mi, Yi, Ki).

More specifically, as shown in FIG. 5, the distribution value Dk is set in correspondence with each of all the possible tone values of 0–255 of the black component Ki. The distribution value Dk has characteristics represented by a curve (solid curve) for the black color (K) in FIG. 6. In other words, the distribution value Dk has a tone value of zero (0) in correspondence with the tone value of the black color component data $K_i$ smaller than a predetermined reference tone value. The distribution value Dk has a tone value greater than zero (0) in correspondence with the tone value of the black color component data $K_i$ equal to or greater than the reference tone value. The tone value of the distribution value Dk increases in association with increase in the tone value of the black color component data $K_i$ from the reference tone value.

Similarly, as shown in FIG. 5, the distribution value Dc is set in correspondence with each of all the possible tone values of 0–255 of the black component Ki so that the distribution value Dc has characteristics represented by a curve (dotted curve) for the cyan color in FIG. 6. Similarly, the distribution value Dm is set in correspondence with each of all the possible tone values of 0–255 of the black component Ki so that the distribution value Dm has characteristics represented by a curve (one-dot-and-one-chain curve) for the magenta color in FIG. 6. The distribution value Dy is set in correspondence with each of all the possible tone values of 0–255 of the black component Ki so that the distribution value Dy has characteristics represented by a curve (two-dot-and-one-chain curve) for the yellow color in FIG. 6.

The distribution table T is produced in a manner described below.

The value of the reference tone value is first determined in a manner described below.

A solid black color patch is formed on a recording medium by black ink only based on black tone data Ki with the maximum tone value (255). That is, a set of black tone data Ki of 255 is first prepared, and outputted as is as output image data Ko to the print unit 21. As a result, the print unit 21 is controlled by the image data Ko (=Ki) of 255 to print a black solid color patch. Then, the optical density (OD-k) of the solid black color patch is measured by a colorimeter or the like. In this example, the optical density (OD-k) is measured as "2.10."

Figure 7:
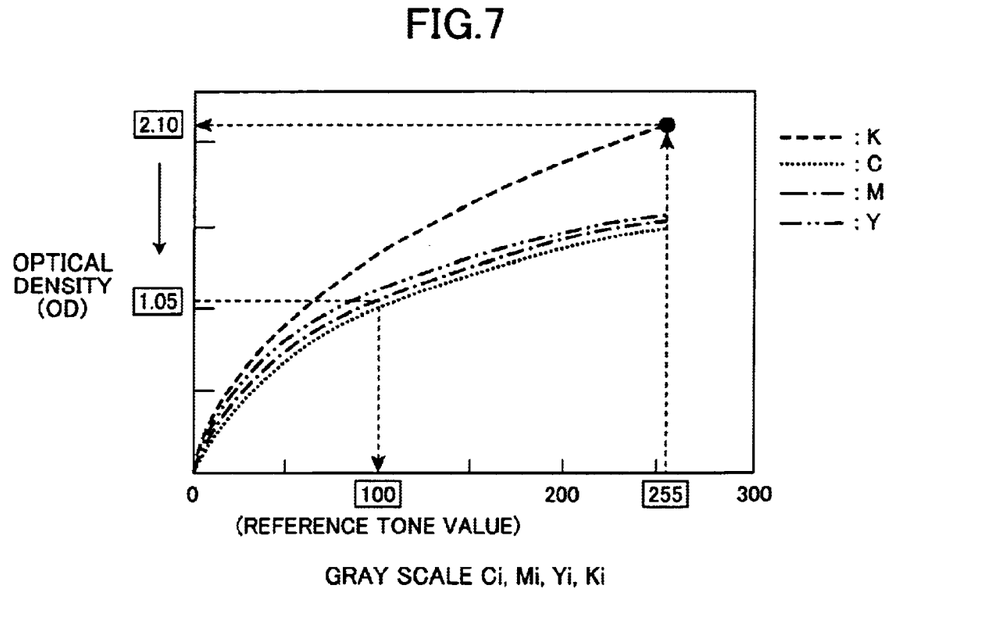
FIG. 7 is a graph representing one method for calculating a reference tone value to be used during the image data conversion process.

Then, a graph is prepared as shown in FIG. 7, in which the horizontal axis denotes the tone value Ai (=Ci, Mi, Yi, Ki) for each of cyan, magenta, yellow, and black, and the vertical axis denotes the optical density. The measured optical density (OD-k) of the solid black color patch is indicated in the graph by a solid large dot.

Next, an optical density curve is calculated for each of cyan, magenta, and yellow colors.

It is noted that cyan color ink has three color components of cyan, magenta, and yellow. Magenta color ink has three color components of cyan, magenta, and yellow. Yellow color ink has three color components of cyan, magenta, and yellow.

It is assumed that the cyan color ink has cyan, magenta, and yellow color components at densities Cc, Cm, and Cy, respectively, that the magenta color ink has cyan, magenta, and yellow color components at densities Mc, Mm, and My, respectively, and that the yellow color ink has cyan, magenta, and yellow color components at densities Yc, Ym, and Yy, respectively. The values of the densities Cc, Cm, Cy, Mc, Mm, My, Yc, Ym, and Yy can be determined by measuring the cyan ink, magenta ink, and yellow ink by a colorimeter or the like.

In order to produce a single gray color patch having a desired optical density (OD-cmy) by mixing the cyan, magenta, and yellow inks together, the cyan, magenta, and yellow inks have to be ejected at ejection rates of Lc, Lm, and Ly (where $0 \leq Lc, Lm, Ly \leq 1$) that satisfy the following equations (1):

$$OD\text{-}c = Lc*Cc + Lm*Mc + Ly*Yc,$$

$$OD\text{-}m = Lc*Cm + Lm*Mm + Ly*Ym,$$

$$OD\text{-}y = Lc*Cy + Lm*My + Ly*Yy,$$

$$OD\text{-}c = OD\text{-}m = OD\text{-}y = OD\text{-}cmy$$

$$Lc = Ci/255,$$

$$Lm = Mi/255, \text{ and}$$

$$Ly = Yi/255 \quad (1)$$

wherein (OD-c) is the optical density of the cyan component of the gray color patch, (OD-m) is the optical density of the magenta component of the gray color patch, and (OD-y) is the optical density of the yellow component of the gray color patch.

It is therefore known that in order to produce a gray color patch with a desired optical density (OD-cmy), cyan, magenta, and yellow tone values Ci, Mi, Yi satisfying the above-described equations (1) should be prepared, and outputted as they are as output values Co, No, Yo to the printer 2 so that the printer 2 will eject cyan, magenta, and yellow inks at the corresponding ejection rates Lc, Lm, Ly.

In other words, in order to produce an arbitrary gray color patch with a desired optical density (OD-cmy), a cyan tone value Ci satisfying the above-described equations (1) should be prepared. In order to produce a plurality of gray color patches with a plurality of different optical densities (OD-cmy), a plurality of cyan tone values Ci should be prepared that satisfy the above-described equations (1) with respect to the subject plural optical densities (OD-cmy). An optical density curve for cyan is therefore determined, as indicated by a dotted line in FIG. 7, based on the relationship between the plural optical densities (OD-cmy) (vertical axis in the graph) and the corresponding cyan tone values Ci (horizontal axis in the graph).

Similarly, in order to produce an arbitrary gray color patch with a desired optical density (OD-omy), a magenta tone value Mi satisfying the above-described equations (1) should be prepared. In order to produce a plurality of gray color patches with plural different optical densities (OD-cmy), a plurality of magenta tone values Mi should be prepared that satisfy the above-described equations (1) with respect to the subject plural optical densities (OD-cmy). An optical density curve for magenta is therefore determined, as indicated by a one-dot-and-one-chain line in FIG. 7, based on the relationship between the plural optical densities (OD-cmy) (vertical axis in the graph) and the corresponding magenta tone values Mi (horizontal axis in the graph).

Similarly, in order to produce an arbitrary gray color patch with a desired optical density (OD-cmy), a yellow tone value Yi satisfying the above-described equations (1) should be prepared. In order to produce a plurality of gray color patches with plural different optical densities (OD-cmy), a plurality of yellow tone values Yi should be prepared that satisfy the above-described equations (1) with respect to the subject plural optical densities (OD-cmy). An optical density curve for yellow is therefore determined, as indicated by a two-dot-and-one-chain line in FIG. 7, based on the relationship between the plural optical densities (OD-cmy) (vertical axis in the graph) and the corresponding yellow tone values Yi (horizontal axis in the graph).

Thus, optical density curves for cyan, magenta, and yellow inks are determined as shown in FIG. 7.

Then, on the thus prepared cyan ink curve, the tone value Ci (along the horizontal axis) is determined with respect to the optical density (OD-cmy) that is a half (½) of the optical density ("2.10," in this example) of the solid black patch. Similarly, on the magenta curve, the tone value Mi (along the horizontal axis) is determined with respect to the optical density (OD-cmy) that is a half of the optical density "2.10" of the solid black patch. Also on the yellow curve, the tone value Yi (along the horizontal axis) is determined with respect to the optical density (OD-cmy) that is a half of the optical density "2.10" of the solid black patch. In this example, a half (½) of the optical density "2.10" is calculated as "1.05." Accordingly, in correspondence with the optical density (OD-cmy) of "1.05", a tone value Ci of "110" is determined on the cyan curve, a tone value Mi of "100" is determined on the magenta curve, and a tone value Yi of "90" is determined on the yellow curve. Then, an average value of the selected tone value values Ci, Mi, Yi is determined as the reference tone value. In this example, the reference tone value is determined as "100". It is noted that instead of using the average value, the minimum value of the selected tone values Ci, Mi, Yi may be determined as the reference tone value.

Thus, according to the method described above, an appropriate reference tone value can be determined easily and quickly.

After the reference tone value is set as described above, the distribution value Dk is set in correspondence with each of all the 256 black tone values Ki of 0 to 255 in a manner described below.

First, as shown in FIGS. 5 and 6, the distribution value Dk is set to zero (0) in correspondence with all of the black tone values Ki in the range of smaller than the reference tone value ("100" in this example).

In order that the distribution value Dk will increase in a monotone nondecreasing manner from the reference tone value Ki (100) toward the maximum tone value Ki (255) to finally reach the maximum distribution value Dk (255), a desirable exponential function is selected to produce a curve for the distribution value Dk as indicated by a solid line in FIG. 6. Then, along the thus produced black distribution curve Dk, the distribution value Dk is set, as shown in FIG. 5, for each of all the black tone values Ki in the range between the reference tone value (100) and the maximum tone value (255).

After the distribution value Dk is thus set for all the black tone values Ki in the range of 0 to 255, distribution values Dc, Dm, and Dy are set for all the black tone values Ki of 0 to 255 in a manner described below.

Figure 8:
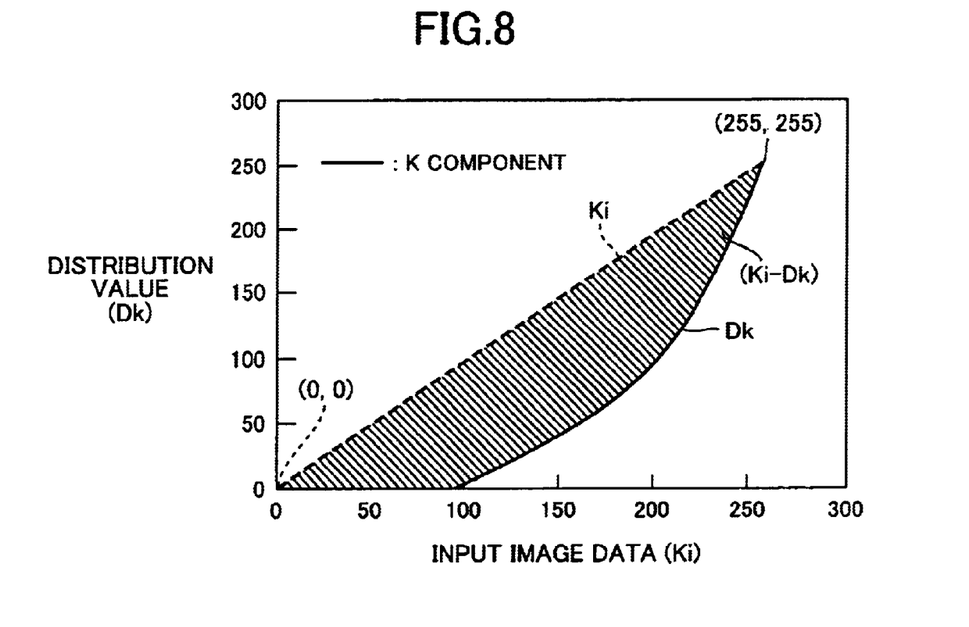
FIG. 8 is a graph representing how to determine distribution values for three color components of cyan, magenta, and yellow.

It is noted that the distribution value Dk defines a black distribution curve as indicated by a solid line in FIG. 8. (This black distribution curve is the same as that indicated by a solid line in FIG. 6.) It is noted that the black tone value Ki can be indicated by a linear broken line, in FIG. 8, which connects a minimum tone point (0, 0) to a maximum tone point (255, 255). The difference, between the black tone value $K_i$ and the black distribution value Dk, is defined as a distance (Ki−Dk) between the upper linear broken line and the lower solid curve, and is indicated by a shadow area in the figure. The distribution values Dc, Dm, Dy are defined as tone values Ci, Mi, Yi for cyan, magenta, and yellow inks that are required to reproduce the tone difference (Ki−Tk) by using cyan ink, magenta ink, and yellow ink. This means that in order to reproduce an arbitrary input black tone value $K_i$, a part with the distribution value Dk is reproduced using black ink, while a remaining part with the distribution value (Ki−Dk) is divided into distribution values Dc, Dm, Dy and is reproduced using cyan ink, magenta ink, and yellow ink.

Accordingly, for each black tone value Ki of 0–255, a tone difference (Ki−Dk), defined between the upper linear broken line Ki and the lower solid curve Dk, is calculated as a tone to be reproduced by cyan, magenta, and yellow inks. Then, distribution values DC, DM, and Dy are determined as tone values Ci, Mi, Yi that are required to print ink of cyan, magenta, and yellow colors, respectively, to reproduce the black tone difference (Ki−Dk).

It is noted that the optical density (OD-cmy) of an arbitrary tone difference (Ki−Dk) is determined based on the optical density (OD-k) of the solid black patch ("2.10" in this example) and on the tone difference amount (Ki−Dk) by the following equation (2):

$$(OD\text{-}cmy) = (OD\text{-}k) * (Ki-Dk)/255 \qquad (2).$$

It is also noted that the distribution value Dc is determined for the optical density (OD-cmy) by referring to the cyan curve in FIG. 7. That is, a tone value (horizontal axis) Ci of the cyan curve with respect to the optical density (OD-cmy) (vertical axis) is determined as the distribution value Dc. Similarly, the distribution value Dm is determined for the optical density (OD-cmy) by referring to the magenta curve in FIG. 7. That is, a tone value (horizontal axis) Mi of the magenta curve with respect to the optical density (OD-cmy) (vertical axis) is determined as the distribution value Dm. The distribution value Dy is determined for the optical density (OD-cmy) by referring to the yellow curve in FIG. 7. That is, a tone value (horizontal axis) Yi of the yellow curve with respect to the optical density (OD-cmy) (vertical axis) is determined as the distribution value Dy.

For example, for input black data Ki of "200", the distribution value Dk, which should be reproduced by black color ink, is determined as equal to "100" by referring to the solid line of FIG. 8. The tone difference (Ki−Dk), which should be compensated for by ink of cyan, magenta, and yellow, is calculated as equal to "100" as a distance between the upper linear broken line (Ki=200) and the lower solid curve (Dk=100). The optical density (OD-cmy) of the tone difference (Ki−Dk) of "100" is determined by 2.10×100/255=0.82 by the above-described equation (2). On the cyan curve in FIG. 7, the tone value Ci (horizontal axis) has a value of "50" in correspondence with the optical density (vertical axis) of 0.82. Accordingly, the distribution value Dc is set to "50" in correspondence with the input black data Ki of 200. On the magenta curve in FIG. 7, the tone value Mi (horizontal axis) has a value of "48" in correspondence with the optical density (vertical axis) of 0.82. Accordingly, the distribution value Dm is set to "48" in correspondence with the input black data Ki of 200. On the yellow curve in FIG. 7, the tone value Yi (horizontal axis) has a value of "46" in correspondence with the optical density (vertical axis) of 0.82. Accordingly, the distribution value Dy is set to "46" in correspondence with the input black data Ki of 200.

In the same manner as described above for Ki="200", for each of all the remaining tone values 0–199 and 201–255 of the black tone value Ki, distribution values Dc, Dm, and Dy are determined by calculating the tone difference (Ki−Dk), by calculating the optical density (OD-cmy) of the tone difference (Ki−Dk), and by referring to the cyan, magenta, and yellow curves in FIG. 7. As a result, the distribution values Dc, Dm, and Dy are plotted as shown in FIG. 6, and are stored as shown in FIG. 5. Thus, the distribution values Dc, Dm, Dy, and Dk are set to have characteristics shown in FIG. 6 with respect to all the black tone values Ki of 0–255.

It is noted that the thus obtained distribution values Dc, DM, and Dy have the following relationships with the ink ejection rates of Lc, Lm, Ly:

$$Dc = 255 * Lc,$$

$$Dm = 255 * Lm, \text{ and}$$

$$Dy = 255 * Ly.$$

With using the distribution table T, the image recording system 100 executes the image data conversion process program stored in the hard disk 14. As a result, input image data ($C_i$, $M_i$, $Y_i$, $K_i$), which is configured from cyan, magenta, yellow, and black color components and which has been prepared by an image preparation application or the like, is converted into output image data (Co, Mo, Yo, Ko) that is appropriate for the color printer 2. The output image data (Co, Mo, Yo, Ko) is then outputted to the color printer 2.

Figure 3:
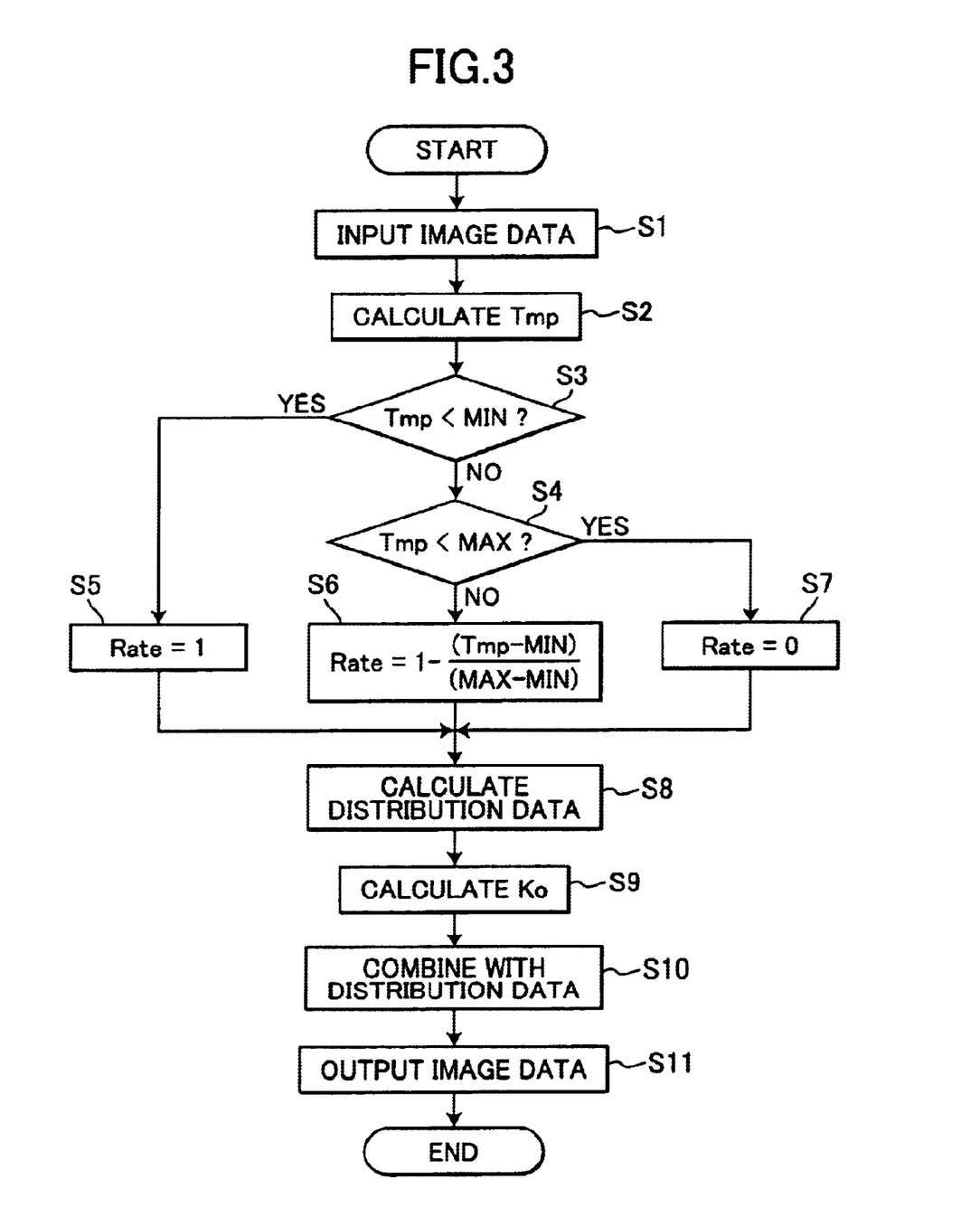
FIG. 3 is a flowchart representing the image data conversion process of the present embodiment.

This image data conversion process will be described below while referring to the flowchart of FIG. 3.

First, in S1, the CPU 11 stores, in a work area of the RAM 13, input image data ($C_i$, $M_i$, $Y_i$, $K_i$) which is configured from cyan, magenta, yellow, and black color components, and which has been prepared by an image preparation application or the like.

Then, in S2, the CPU 11 calculates a brightness index Tmp for the input image data ($C_i$, $M_i$, $Y_i$, $K_i$). As indicated in the following equation (3), the smallest value of the input image data ($C_i$, $M_i$, $Y_i$) is used as is as the brightness index Tmp:

$$Tmp = \text{Min}(C_i, M_i, Y_i) \quad (3)$$

wherein Min ($C_i$, $M_i$, $Y_i$) is a function for extracting the smallest value from the parenthesized variables $C_i$, $M_i$, $Y_i$.

Next, in S3, the CPU 11 judges whether or not the calculated brightness index Tmp is smaller than a predetermined fixed value MIN, which has been set in advance. If so (S3:YES). then the program proceeds to S5 in which a distribution process coefficient "rate" is set to "1" and the routine proceeds to S8. On the other hand, if the brightness index Tmp is greater than or equal to the fixed value MIN (S3:NO), then it is further judged in S4 whether or not the brightness index Tmp is larger than another predetermined fixed value MAX, which has also been set in advance. If so (S4:YES), then the program proceeds to S7 in which the distribution process coefficient "Rate" is set to "0" and the routine proceeds to S8. On the other hand, if the brightness index Tmp is less than or equal to the fixed value MAX (S4:NO, that is, MIN≦Tmp≦MAX), then the program proceeds to S6 in which the distribution process coefficient "Rate" is calculated according to the equation (4) indicated below, and the routine proceeds to S8:

$$\text{Rate} = 1 - (Tmp - \text{MIN})/(\text{MAX} - \text{MIN}) \quad (4)$$

Figure 4:
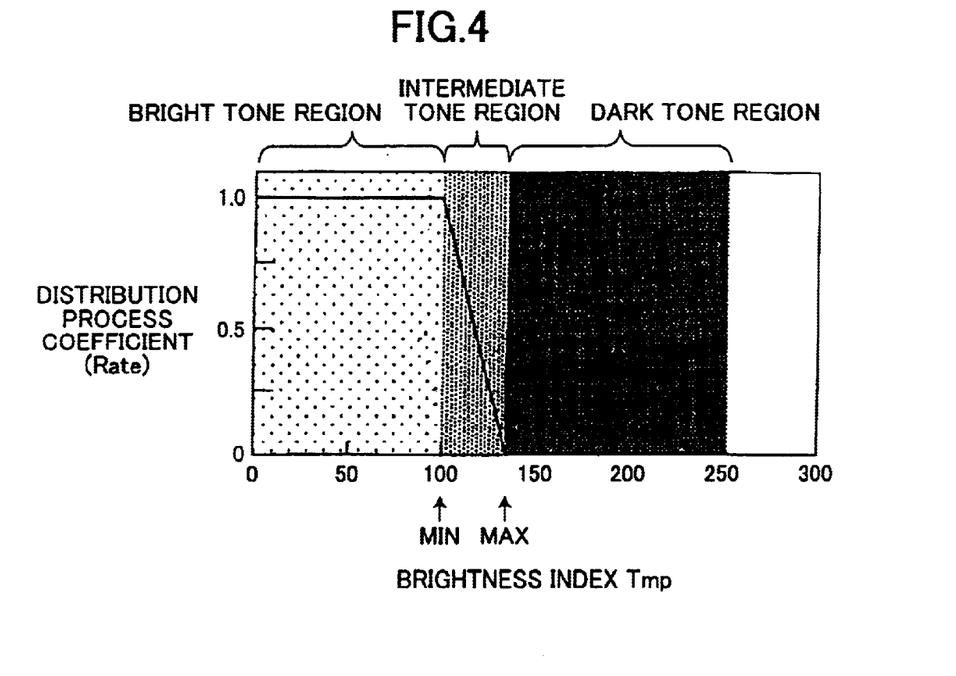
FIG. 4 is graph representing changes in a distribution process coefficient "Rate", which is used during the image data conversion process of FIG. 3, with respect to a brightness index "Tamp" of input image data.

It is noted that the fixed values MIN and MAX are for partitioning the gray scale into bright, intermediate, and dark tone regions. As shown in FIG. 4, in the gray scale, the bright tone region has the tone value of 0 to MIN, the intermediate tone region has the tone value of MIN to MAX, and the dark tone region has the tone value of MAX to 255. When the brightness index Tmp of the input image data is located in the bright tone region, the distribution process coefficient "Rate" is set as being fixed to "1". When the brightness index Tmp is in the dark tone region, the distribution process coefficient "Rate" is set as being fixed to "0". When the brightness index Tmp is in the intermediate tone region, the distribution process coefficient "Rate" changes between "0" and "1" proportionally to the tone value (brightness index Tmp) of the input image data. In this example, the fixed value MIN is set to 100 and the other fixed value MAX is set to 128.

When the distribution process coefficient "Rate" is determined as described above, then in S8, distribution data Tc, Tm, Ty, and Tk is calculated according to equations (5) indicated below, based on the distribution process coefficient "Rate" and on the input image data $K_i$ for the black component:

$$Tc = \text{Rate} \times \text{Table } C[Ki]$$

$$Tm = \text{Rate} \times \text{Table } M[Ki]$$

$$Ty = \text{Rate} \times \text{Table } Y[Ki]$$

$$Tk = \text{Rate} \times \text{Table } K[Ki] \quad (5)$$

wherein Table C[Ki], Table M[Ki], Table Y[Ki], Table K[Ki] are the distribution values Dc, Dm, Dy, Dk, which are stored in the distribution table (look up table) T of FIGS. 5 and 6 in association with the value of the input black tone value $K_i$.

It is noted that as described already, the distribution value Dk has characteristics represented by the black color curve in FIG. 6. That is, the distribution value Dk has a tone value of zero (0) when the black color component data $K_i$ has a tone value smaller than the predetermined reference tone value. The distribution value Dk becomes greater than zero (0) when the tone value of the black color component data $K_i$ reaches the reference tone value. The distribution value Dk gets gradually larger in association with increase in the tone value of the black color component data $K_i$. Accordingly, black ink dots will not be produced in light colored regions with its black tone value Ki being smaller than the reference tone value.

The distribution data Tc, Tm, and Ty indicates the amounts of portions in the input image data $K_i$ to be distributed to input image data $C_i$, $M_i$, and $Y_i$. The distribution data Tk will be used to calculate output image data $K_o$ after the portions of the input image data $K_i$ are distributed to the input image data $C_i$, $M_i$, $Y_i$.

It is noted that the distribution values Dc, Dm, Dy, Dk, stored in the distribution table T, are not used as they are to determine distribution data Tc, Tm, Tr, Tk. As indicated by equations (5), each of the distribution values Dc, Dm, Dy, Dk is multiplied by the distribution process coefficient "Rate", which has been calculated previously in accordance with whether the input tone data (Ci, Mi, Yi, Ki) is located in the bright, intermediate, or dark tone region of FIG. 4. As a result, the rate how the distribution values Dc, Dm, Dy, Dk are distributed to the distribution data Tc, Tm, Ty, Tk changes in accordance with where the input tone data is located. That is, when the input data is in the bright tone region, where black dot "roughness" will appear highly noticeable, the distribution process coefficient "Rate" becomes "1" so that the distribution values Dc, Dm, Dy, Dk are used as they are as the distribution data Tc, Tm, Ty, Tk. However, when the input data is in the dark tone region, where black ink dot "roughness" is virtually unnoticeable, the distribution process coefficient "Rate" is set to "0" so that the distribution data Tc, Tm, Ty, Tk become zero. Thus, the input image data $K_i$ for black component is not distributed at all to the cyan, magenta, or yellow color components. When the input data is in the intermediate tone region, the distribution process coefficient "Rate" is greater than "0" and less that "1" so that the input image data $K_i$ for the black component is distributed at a corresponding, proper rate to the cyan, magenta, or yellow color components.

Once the distribution data Tc, Tm, Ty, Tk is calculated in S8, then in S9 output image data $K_o$ for black component is calculated based on the following equation (6):

$$K_o = Tk + (1 - \text{Rate}) \times K_i \quad (6)$$

Accordingly, when the input image data is in the bright tone region, because the distribution process coefficient "Rate" is "1", the output image data $K_o$ is equal to the distribution data Tk, which is equal to the distribution value Dk, so the distribution data Tk is converted as it is for the output image data $K_o$. However, when the input image data is in the dark tone region, because the distribution process coefficient "Rate" is "0", the output image data $K_o$ is the same as the input image data $K_i$ so that the input image data $K_i$ is used as is as the output image data $K_o$. When the input image data is in the intermediate tone region, because the distribution process coefficient "Rate" is greater than "0"

and less that "1", the output image data $K_o$ is calculated as follows:

$$K_o = \text{Rate} \cdot Dk + (1-\text{Rate}) \cdot K_i.$$

Next, in S10, output image data $C_o$, $M_o$, $Y_o$ for cyan, magenta, and yellow components is calculated by combining the distribution data Tc, Tm, Ty with the input image data $C_i$, $M_i$, $Y_i$ according to the following equations (7):

$$Co = Tc + Ci \cdot ((255-Tc)/255$$

$$Mo = Tm + Mi \cdot ((255-Tm)/255$$

$$Yo = Ty + Yi \cdot ((255-Ty)/255 \qquad (7)$$

Figure 9:
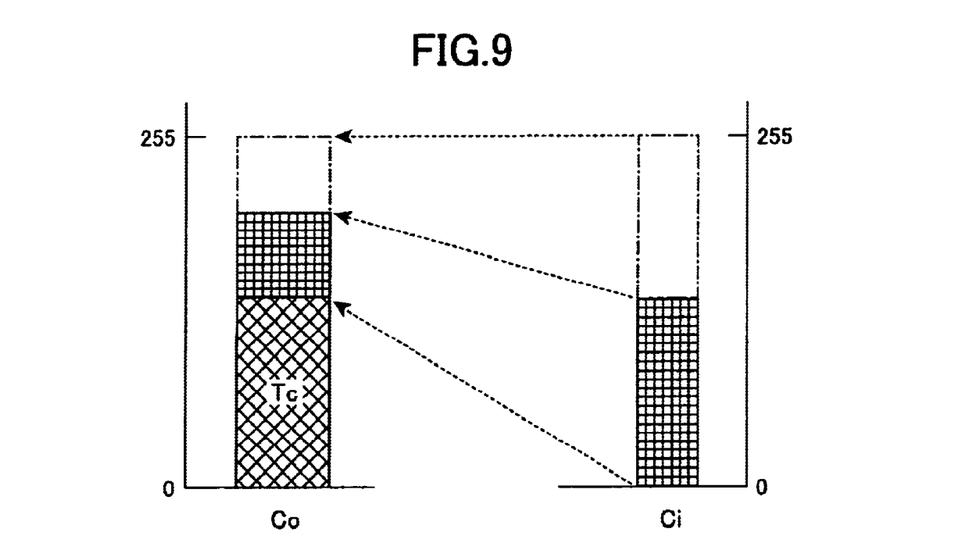
FIG. 9 is a graph representing a method for combining distribution data to input image data during the image data conversion process.

Thus, the distribution data Tc, Tm, Ty is combined with the input image data $C_i$, $M_i$, $Y_i$ in a manner that the input image data $C_i$, $M_i$, $Y_i$ is not simply added to the distribution data Tc, Tm, Ty. Instead, as shown in FIG. 9 for cyan component, first the distribution data Tc is set. Then, input image data $C_i$ is compressed into the region of the amount of (255—distribution data Tc), and is added to the distribution data Tc. Therefore, the resultant output image data $C_o$ will never exceed the maximum tone value of 255. The same is for magenta and yellow. Accordingly, the tone of cyan, magenta, and yellow can be effectively prevented from flattening in the dark tone region.

More specifically, if CMY components were simply combined with gray components Tc, Tm, and Ty, the values of the CMY components will possibly overflow because CMY components have their own original values. That is, each of the CMY components can represent values in the tone range of 0 to 255. If CMYK components have original values (255, 0, 0, 50), for example, because C component already has the maximum value of 255, it is impossible to distribute the gray components Tc, Tm, Ty of 50 to the C component. According to the embodiment, therefore, the Tc, Tm, Ty distribution operation is performed according to the equations (7) by considering the values of the respective CMY components Ci, Mi, Yi.

Next, in S11 the output image data $C_o$, $M_o$, $Y_o$, $K_o$ thus obtained from the input image data $C_i$, $M_i$, $Y_i$, $K_i$ is outputted to the color printer 2. The print unit 21 prints a full color image on the recording medium based on the output image data $C_o$, $M_o$, $Y_o$, $K_o$.

By executing the image data conversion process method describe above, input image data Ki for the black color component is divided into distribution data Tc, Tm, Ty, and Tk. The distribution data Tc, Tm, and Ty is combined to the input image data Ci, Mi, and Yi. More specifically, of the input image data $K_i$ for the black component, the distribution data Tk portion is reproduced using black ink, while the distribution data Tc, Tm, Ty portions are reproduced using the three ink colors of cyan, magenta, and yellow. Therefore, black ink dots can be prevented from being printed on light colored areas, so that undesirable black dot "roughness" can be prevented from being generated in light colored areas.

In particular, black ink is not used at all when the input image data $K_i$ is in the bright tone region, that is, up to the predetermined reference tone value. In the bright tone region, the gray scale is reproduced using only the three ink colors of cyan, magenta, and yellow. Therefore, no black ink will be ejected onto those light colored areas, so that black ink "roughness" can be completely eliminated from the light colored areas. Accordingly, the fixed value MIN, which is the reference used in S3 (FIG. 3) when calculating the distribution process coefficient "Rate", is normally set equal to the reference tone value ("100" in this example) However, the fixed value MIN need not always set equal to the reference tone value.

In the dark tone region, where black ink dot "roughness" is virtually unnoticeable, the input image data $K_i$ is outputted to the printer 2 as is for the output image data $K_o$, without distributing any portion of the input image data $K_i$ to the input image data $C_i$, $M_i$, $Y_i$.

Because distribution of black component to CMY components is not performed in the dark tone region, degradation in black tone can be prevented from occurring. That is, the quality of the gray scale can be effectively prevented from degrading in the dark region. It is ensured that black color can be effectively reproduced at a sufficiently high density.

It is noted that in order to reproduce black color by CMY ink, it is necessary to attach, onto a recording medium, a larger amount of ink than reproducing black color by K ink only. Because ink has solvent mixed with pigment, increase in the amount of ink, attached to the recording medium, indicates that the entire amount of the solvent, attached to the recording medium, increases. When a too large amount of liquid is attached to the recording medium, the amount of the surface reflection increases, and therefore the surface becomes shining. Accordingly, if distribution of black component to the CMY components were performed in the dark tone region, the dark tone region will appear a lighter tone. An undesirable pseudo-contour will possibly appear noticeable around that region. Therefore, according to the present embodiment, distribution of black component to CMY components is not performed in the dark tone region. The desired dark density of the dark tone region can therefore be reliably reproduced.

Additionally, according to the present embodiment, because distribution of black component to CMY components is not performed in the dark tone region, the gray scale can be prevented from being colored in dark tone region.

It is noted that inks of cyan, magenta, and yellow have different densities. Accordingly, in order to reproduce some achromatic, gray tone, it is necessary to attach inks of those colors at different rates. For example, while attaching yellow ink at 50% recording density, cyan and magenta inks have to be attached at 40% recording densities. Such a relationship will be continued to the dark tone region. When attaching cyan and magenta ink at 80% recording densities, it will possibly be necessary to attach yellow ink at 100% recording density. It is theoretically possible to reproduce any gray tone by adjusting the color balance among cyan, magenta, and yellow when the attaching amount in each ink is smaller than the maximum amount (100%). However, when the attaching amount of ink for at least one color exceeds the maximum amount (100%), the gray tone will be colored with the too excessive amount of that ink. According to the present embodiment, because distribution of the K component to the CMY components is not performed in the dark tone region, it is possible to prevent the dark tone region from being colored.

It is noted that the fixed value MAX, which is used in S4 (FIG. 3) as a reference when calculating the distribution process coefficient "Rate", should be set to such a value that can prevent occurrence of the above-described quality degradation in the dark tone region.

For example, the amount of the fixed value MAX can be determined in a manner described below.

First, the print unit 21 is controlled to produce a plurality of mixed-color color patches by ejecting all of the cyan ink, magenta ink, yellow ink, and black ink at a plurality of tone levels that are different from one another in stepwise increments. Each color patch is produced according to the same tone level for all of the four color inks.

Then, the plurality of mixed-color color patches are visually observed to select one or more allowable color patches where no ink bleeding appear. Among the selected allowable one or more color patches, one color patch that has printed with the highest tone level is further selected. The tone level of this color patch is determined as a highest limit for the value MAX. The value MAX is then set to some desirable value in a range that is defined as equal to or smaller than the determined highest limit. For example, the image conversion process of FIG. 3 is performed to produce output images by using a candidate value as the value MAX, wherein the candidate value is smaller than or equal to the highest limit. The image conversion process is performed repeatedly while changing the candidate value. The output images obtained during the repeatedly-performed image conversion processes are visually observed. The value MAX is set to one candidate value that has been used during one image conversion process that has attained the best quality output image.

According to the present embodiment, the intermediate tone region is provided between the bright tone region, where the black component is distributed completely amongst the three color components of cyan, magenta, and yellow, and the dark tone regions where the black component is not distributed amongst the three color components of cyan, magenta, and yellow at all. In the intermediate tone region, the black component is distributed amongst the three color components of cyan, magenta, and yellow at a properly-changing rate. Therefore, discontinuity can be prevented from being generated between the bright and dark tone regions, so that pseudo contours or the like are not generated in the recorded full color image.

While the invention has been described in detail with reference to the specific embodiment thereof, it would be apparent to those skilled in the art that various changes and modifications may be made therein without departing from the spirit of the invention, the scope of which is defined by the attached claims.

For example, according to the present embodiment, the smallest value of the input image data $C_i$, $M_i$, $Y_i$ is used as the brightness index Tmp of the image data. However, the average value of the input image data $C_i$, $M_i$, $Y_i$ could be used instead.

In the above-described embodiment, when the brightness index "Tmp" is located in the intermediate tone region, the distribution data Dc, Dm, Dy, and Dk is multiplied with the coefficient "Rate" of a value greater than zero (0) and smaller than one (1), before being combined with the input image data Ci, Mi, Yi, and Ki. However, the distribution data Dc, Dm, Dy, and Dk may be adjusted in other various manners before being combined with the input image data Ci, Mi, Yi, and Ki.

In the above-described embodiment, the reference tone value is set to such a tone value that can produce, by cyan, magenta, and yellow inks according to corresponding distribution data Dc, Dm, Dy, a gray color patch that has an optical density equal to a half (½) of the optical density (OD-k) of 2.10 of the solid black color patch, which is produced according to image data Ki of the maximum tone value (255). More specifically, the reference tone value is set to the average value of tone values Ci(=Dc). Mi(=Dm), Yi(=Dy) that can produce a gray color patch of the optical density (1.05), by cyan, magenta, and yellow inks according to the corresponding ejection rates Lc, Lm, Ly, wherein Lc=Ci/255 (=Dc/255), Lm=Mi/255 (=Dm/255), and Ly=Yi/255 (=Dy/255). However, the reference tone value may be set to another tone value that can produce, by cyan, magenta, and yellow inks according to corresponding distribution data Dc, Dm, Dy, a gray color patch that has an optical density whose value has some other predetermined relationship with the optical density (2.10) of the solid black color patch The reference tone value can be determined in other various manners. For example, the reference tone value can be determined in a manner described below.

Figure 10:
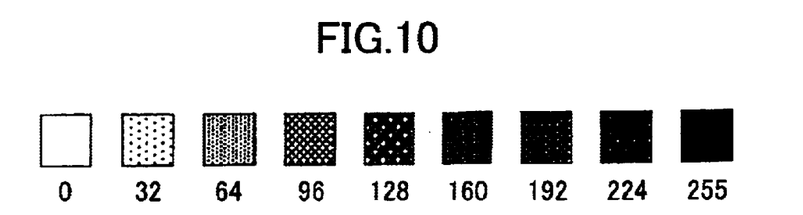
FIG. 10 is a schematic view showing color patches produced according to another method for determining the reference tone value.

The print unit 21 is controlled to produce a plurality of mixed-color color patches by ejecting ink of three colors of cyan, magenta, and yellow at a plurality of tone levels that are different from one another in stepwise increments. Each color patch is produced according to the same tone level for all of the three color inks. More specifically, a plurality of sets of input image data (Ci, Mi, Yi) are prepared with their tone values being arranged at a fixed amount of interval. For example, a plurality of sets of input image data (Ci, Mi, Yi) are prepared, wherein Ci=Mi=Yi=0, Ci=Mi=Yi=1, Ci=Mi=Yi=2, Ci=Mi=Yi=3, . . . , and Ci=Mi=Yi=255. Then, the thus prepared plural sets of input image data (Ci, Mi, Yi) are outputted as they are as plural sets of output image data (Co, Mo, Yo) to the print unit 21. As a result, a plurality of mixed-color color patches are produced at a plurality of tone levels of 0, 1, 2, 3, 4, . . . , 255. Thus, the plurality of mixed-color color patches are produced by inks of cyan, magenta, and yellow in stepwisely-increasing dot recording densities. It is noted that among all the plurality of color patches, only nine color patches are shown in FIG. 10.

The print unit 21 is further controlled to eject black ink onto each of the mixed-color color patches in a predetermined dot recording density, of 1% for example, that corresponds to a predetermined black tone value Ki. More specifically, a predetermined black tone value Ki is prepared, and is outputted as it is as output image data Ko to the print unit 21. As a result, black ink is ejected at the corresponding dot recording density onto each of the mixed-color color patches.

Then, the plurality of color patches are visually observed by an operator. It can be observed that dot roughness appear noticeable on one or more color patches (unallowable color patches) which have been printed with relatively low CMY tone values, while dot roughness appear unnoticeable on other color patches (allowable color patches) which have been printed with higher CMY tone values. The operator visually selects one "border" color patch where black dot "roughness" no longer appears noticeable. In other words, among those allowable color patches that result in unnoticeable black dot "roughness", the operator selects one color patch that has been prepared by the lowest CMY tone value as the "border" color patch. The tone value Ci (=Mi=Yi) of the "border" color patch is set as the reference tone value.

What is claimed is:

1. An image data conversion method for converting input image data for four color components of cyan, magenta, yellow, and black into output image data for recording operation, the method comprising the steps of:

receiving input image data for four color components of cyan, magenta, yellow, and black;

determining based on the input image data for black component, distribution data for the four color components of cyan, magenta, yellow, and black, determining, based on the input image data for the black component and on the distribution data for the black component, output image data for the black component; and combining the distribution data for cyan, magenta, and yellow color components and the input image data for the cyan, magenta, and yellow color components, respectively, thereby converting the input image data for the three color components of cyan, magenta, and yellow into output image data for the three color components of cyan, magenta, and yellow.

2. An image data conversion method as claimed in claim 1, wherein the distribution data for the black color component has a characteristic that the distribution data has a tone value of zero when the tone value of the input image data for the black component is lower than predetermined reference tone value, that the tone value of the distribution data becomes greater than zero when the tone value of the input image data for the black component is equal to or greater than the predetermined reference tone value, and that the tone value of the distribution data increases as the tone value of the input image data for the black component increases from the predetermined reference tone value.

3. An image data conversion method as claimed in claim 2, wherein the reference tone value is set to a tone value that can produce, according to the distribution data for the three color components of cyan, magenta, and yellow, a color patch that has an optical density whose value has a predetermined relationship with another optical density represented by another color patch that is produced according to image data of the maximum tone value for the black color component.

4. An image data conversion method as claimed in claim 3, wherein the reference tone value is set to a tone value that can produce, according to the distribution data for the three color components of cyan, magenta, and yellow, a color patch that has an optical density whose value is equal to a half of another optical density represented by another color patch that is produced according to image data of the maximum tone value for the black color component.

5. An image data conversion method as claimed in claim 1, wherein the distribution data for the three color components of cyan, magenta, and yellow has tone values to reproduce, with cyan, magenta, and yellow color components, a gray scale whose tone level corresponds to a difference between the tone value of the distribution data for the black component and the tone value of the input image data for the black component.

6. An image data conversion method as claimed in claim 1, wherein the manner of combining the distribution data to the input image data is switched according to the tone values of the input image data for the three color components of cyan, magenta, and yellow.

7. An image data conversion method as claimed in claim 6, wherein the determining step includes the step of combining the distribution data for black color component with the input image data for the black color component, thereby determining the output image data for the black color component.

8. An image data conversion method as claimed in claim 7, wherein when a brightness index, determined based on the tone values of the input image data for the three color components of cyan, magenta, and yellow, is located in a predetermined dark tone region, the input image data for the four color components of cyan, magenta, yellow, and black is converted, as it is, into the output image data, and
wherein when the brightness index is located in a predetermined intermediate tone region, the distribution data for the four color components is adjusted before being combined with the input image data for the corresponding colors.

9. An image data conversion method as claimed in claim 8, wherein when the brightness index is located in the predetermined intermediate tone region, the distribution data for the four color components is multiplied with a coefficient, of a value greater than zero (0) and smaller than one (1), before being combined with the input image data for the corresponding colors.

10. An image data conversion method as claimed in claim 1, wherein the input image data for the three color components of cyan, magenta, and yellow is subjected to a compression process before being combined with the distribution data for the three color components of cyan, magenta, and yellow, thereby preventing the output image data from exceeding a predetermined maximum tone value.

11. An image data conversion apparatus for converting input image data for four color components of cyan, magenta, yellow, and black into output image data for recording operation, the apparatus comprising:
a receiving unit receiving input image data for four color components of cyan, magenta, yellow, and black;
a determining unit determining, based on the input image data for black component, distribution data for the four color components of cyan, magenta, yellow, and black, and determining, based on the input image data for the black component and on the distribution data for the black component, output image data for the black component; and
a combining unit combining the distribution data for cyan, magenta, and yellow color components and the input image data for the cyan, magenta, and yellow color components, respectively, thereby converting the input image data for the three color components of cyan, magenta, and yellow into output image data for the three color components of cyan, magenta, and yellow.

12. An image data conversion apparatus as claimed in claim 11, wherein the distribution data for the black color component has a characteristic that the distribution data has a tone value of zero when the tone value of the input image data for the black component is lower than a predetermined reference tone value, that the tone value of the distribution data becomes greater than zero when the tone value of the input image data for the black component is equal to or greater than the predetermined reference tone value, and that the tone value of the distribution data increases as the tone value of the input image data for the black component increases from the predetermined reference tone value.

13. An image data conversion apparatus as claimed in claim 12, wherein the reference tone value is set to a tone value that can produce, according to the distribution data for the three color components of cyan, magenta, and yellow, a color patch that has an optical density whose value has a predetermined relationship with another optical density represented by another color patch that is produced according to image data of the maximum tone value for the black color component.

14. An image data conversion apparatus as claimed in claim 13, wherein the reference tone value is set to a tone value that can produce, according to the distribution data for the three color components of cyan, magenta, and yellow, a color patch that has an optical density whose value is equal to a half of another optical density represented by another color patch that is produced according to image data of the maximum tone value for the black color component.

15. An image data conversion apparatus as claimed in claim 11, wherein the distribution data for the three color components of cyan, magenta, and yellow has tone values to reproduce, with cyan, magenta, and yellow color components, a gray scale whose tone level corresponds to a difference between the tone value of the distribution data for the black component and the tone value of the input image data for the black component.

16. An image data conversion apparatus as claimed in claim 11, wherein the manner of combining the distribution data to the input image data is switched according to the tone values of the input image data for the three color components of cyan, magenta, and yellow.

17. An image data conversion apparatus as claimed in claim 16, wherein the determining unit includes a unit combining the distribution data for black color component with the input image data for the black color component, thereby determining the output image data for the black color component.

18. An image data conversion apparatus as claimed in claim 17, wherein when a brightness index, determined based on the tone values of the input image data for the three color components of cyan, magenta, and yellow, is located in a predetermined dark tone region, the input image data for the four color components of cyan, magenta, yellow, and black is converted, as it is, into the output image data, and
wherein when the brightness index is located in a predetermined intermediate tone region, the distribution data for the four color components is adjusted before being combined with the input image data for the corresponding colors.

19. An image data conversion apparatus as claimed in claim 18, wherein when the brightness index is located in the predetermined intermediate tone region, the distribution data for the four color components is multiplied with a coefficient, of a value greater than zero (0) and smaller than one (1), before being combined with the input image data for the corresponding colors.

20. An image data conversion apparatus as claimed in claim 11, wherein the input image data for the three color components of cyan, magenta, and yellow is subjected to a compression process before being combined with the distribution data for the three color components of cyan, magenta, and yellow, thereby preventing the output image data from exceeding a predetermined maximum tone value.

21. A data storage medium storing, in a manner readable by a computer, data of an image data conversion program for converting input image data for four color components of cyan, magenta, yellow, and black into output image data for recording operation, the program comprising:
a program of receiving input image data for four color components of cyan, magenta, yellow, and black;
a program of determining, based on the input image data for black component, distribution data for the four color components of cyan, magenta, yellow, and black, and determining, based on the input image data for the black component and on the distribution data for the black component, output image data for the black component; and
a program of combining the distribution data for cyan, magenta, and yellow color components and the input image data for the cyan, magenta, and yellow color components, respectively, thereby converting the input image data for the three color components of cyan, magenta, and yellow into output image data for the three color components of cyan, magenta, and yellow.

22. A data storage medium as claimed in claim 21, wherein the determining program includes a program of combining the distribution data for black color component with the input image data for the black color component, thereby determining the output image data for the black color component.

* * * * *